United States Patent
Takahashi

(10) Patent No.: US 10,690,242 B2
(45) Date of Patent: Jun. 23, 2020

(54) ABNORMALITY DETERMINATION DEVICE AND ABNORMALITY DETERMINATION METHOD OF LOCK UP CLUTCH

(71) Applicant: SUBARU CORPORATION, Tokyo (JP)

(72) Inventor: Yoshitaka Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 21 days.

(21) Appl. No.: 16/208,368

(22) Filed: Dec. 3, 2018

(65) Prior Publication Data

US 2019/0293174 A1 Sep. 26, 2019

(30) Foreign Application Priority Data

Mar. 22, 2018 (JP) .................................. 2018-053979

(51) Int. Cl.
| | |
|---|---|
| *F16H 61/14* | (2006.01) |
| *F16H 59/38* | (2006.01) |
| *F16H 61/12* | (2010.01) |

(52) U.S. Cl.
CPC ........... *F16H 61/143* (2013.01); *F16H 59/38* (2013.01); *F16H 61/12* (2013.01); *F16H 2059/385* (2013.01); *F16H 2061/1208* (2013.01); *F16H 2061/1276* (2013.01)

(58) Field of Classification Search
CPC ........ F16H 61/143; F16H 61/14; F16H 61/12; F16H 59/46
See application file for complete search history.

(56) References Cited

U.S. PATENT DOCUMENTS 5,413,539 A * 5/1995 Leonard .............. F16H 61/0009
475/63

FOREIGN PATENT DOCUMENTS

| JP | H02-176265 A | 7/1990 |
| JP | H11-280893 A | 10/1999 |

* cited by examiner

*Primary Examiner* — Derek D Knight
(74) *Attorney, Agent, or Firm* — McGinn IP Law Group, PLLC

(57) ABSTRACT

An abnormality determination device of a lock up clutch includes a controller and a determining unit. The controller sets a lock up clutch in a torque converter at an engaged state or a disengaged state. The torque converter is provided in an automatic transmission of a vehicle. The determining unit determines, on the condition that deceleration of the vehicle on travel with the lock up clutch in the engaged state causes a control signal for disengagement to be outputted from the controller, the presence or the absence of the abnormality in the lock up clutch, on the basis of a determination result as to whether or not a difference between the number of engine rotations and the number of turbine rotations is equal to or larger than a first threshold that varies with a rate of deceleration of the vehicle.

16 Claims, 8 Drawing Sheets

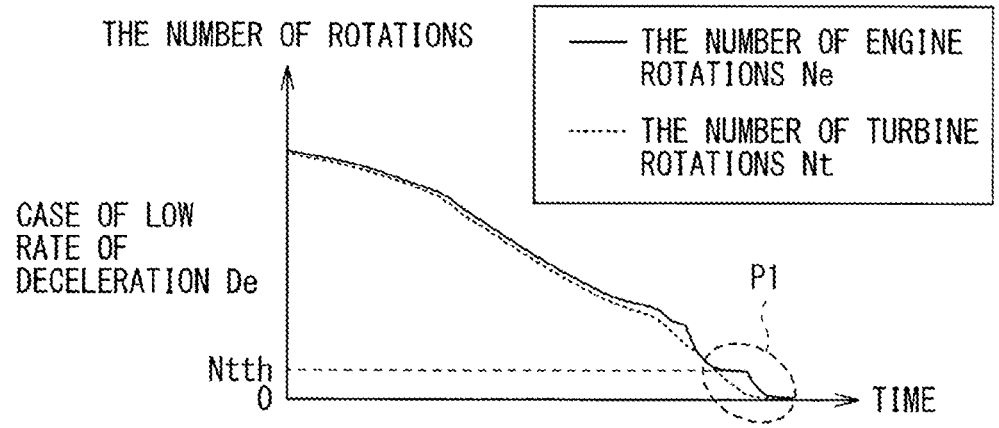
FIG. 4A  CASE OF LOW RATE OF DECELERATION De
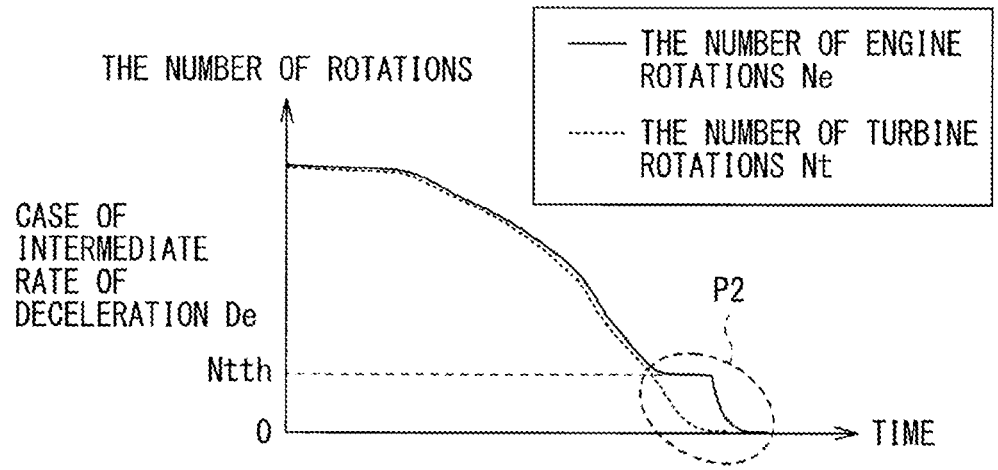
FIG. 4B  CASE OF INTERMEDIATE RATE OF DECELERATION De
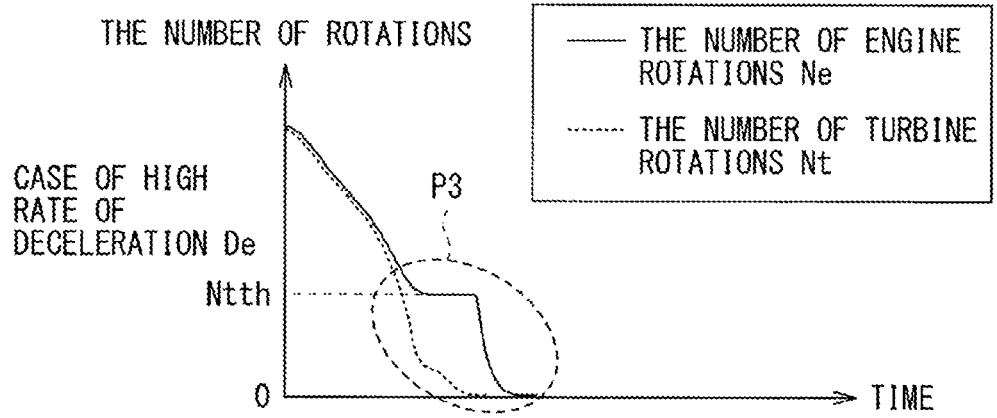
FIG. 4C  CASE OF HIGH RATE OF DECELERATION De

ABNORMALITY DETERMINATION DEVICE AND ABNORMALITY DETERMINATION METHOD OF LOCK UP CLUTCH

CROSS-REFERENCE TO RELATED APPLICATIONS

The present application claims priority from Japanese Patent Application No. 2018-053979 filed on Mar. 22, 2018, the entire contents of which are hereby incorporated by reference.

BACKGROUND

The disclosure relates to an abnormality determination device and an abnormality determination method that make an abnormality determination of a lock up clutch in a vehicle including an automatic transmission having a torque converter.

An automatic transmission in a vehicle, e.g., an automobile, generally includes a torque converter having a lock up clutch. Controlling operation of the lock up clutch causes a rotating member on input side, e.g., a pump impeller, and a rotating member on output side, e.g., a turbine runner, of the torque converter to be set at an engaged state or a disengaged state. Setting the engaged state in accordance with traveling situations of the vehicle makes it possible to attain, for example, enhancement in transmission efficiency of motive power to be transmitted from an engine to the automatic transmission, and enhancement in fuel consumption performance in the vehicle.

In such a lock up clutch, there occurs a case of an abnormality in which, for example, the lock up clutch becomes stuck in the engaged state as mentioned above. Accordingly, inside vehicles, in general, a determination, detection, and/or diagnosis of such an abnormality are made at any time. For example, reference can be made to Japanese Unexamined Patent Application Publication (JP-A) Nos. H02-176265 and H11-280893.

SUMMARY

An aspect of the disclosure provides an abnormality determination device of a lock up clutch. The abnormality determination device includes a controller and a determining unit. The controller is configured to set a lock up clutch in a torque converter at an engaged state or a disengaged state. The torque converter is provided in an automatic transmission of a vehicle. The engaged state includes permitting linkage between a rotating member on input side and a rotating member on output side in the torque converter. The disengaged state includes interrupting the linkage between the rotating member on the input side and the rotating member on the output side. The determining unit is configured to determine presence or absence of an abnormality in the lock up clutch. The abnormality corresponds to a situation that the lock up clutch is stuck in the engaged state. The determining unit is configured to determine, on the condition that deceleration of the vehicle on travel with the lock up clutch in the engaged state causes a control signal to be outputted from the controller, the control signal causing the lock up clutch to make a transition to the disengaged state, the presence or the absence of the abnormality in the lock up clutch, on the basis of a determination result as to whether or not a difference in the number of rotations is equal to or larger than a first threshold. The first threshold varies with a rate of deceleration of the vehicle. The difference in the number of rotations is a difference between the number of engine rotations and the number of turbine rotations. The number of engine rotations is the number of rotations of an engine that transmits rotation to the rotating member on the input side. The number of the turbine rotations is the number of rotations of the rotating member on the output side.

An aspect of the disclosure provides an abnormality determination method of a lock up clutch. The abnormality determination method includes controlling and determining. The controlling includes setting a lock up clutch in a torque converter at an engaged state or a disengaged state. The torque converter is provided in an automatic transmission of a vehicle. The engaged state includes permitting linkage between a rotating member on input side and a rotating member on output side in the torque converter. The disengaged state includes interrupting the linkage between the rotating member on the input side and the rotating member on the output side. The determining includes determining presence or absence of an abnormality in the lock up clutch. The abnormality corresponds to a situation that the lock up clutch is stuck in the engaged state. The determining includes determining, on the condition that deceleration of the vehicle on travel with the lock up clutch in the engaged state causes a control signal to be outputted in the controlling, the control signal causing the lock up clutch to make a transition to the disengaged state, the presence or the absence of the abnormality in the lock up clutch, on the basis of a determination result as to whether or not a difference in the number of rotations is equal to or larger than a first threshold. The first threshold varies with a rate of deceleration of the vehicle. The difference in the number of rotations is a difference between the number of engine rotations and the number of turbine rotations. The number of engine rotations is the number of rotations of an engine that transmits rotation to the rotating member on the input side. The number of turbine rotations is the number of rotations of the rotating member on the output side.

BRIEF DESCRIPTION OF THE DRAWINGS

FIGS. 4A, 4B, and 4C are schematic diagrams illustrating an example of corresponding relation between a time change characteristic of a difference in the number of rotations and the rate of deceleration.

DETAILED DESCRIPTION

In making an abnormality determination regarding a lock up clutch, it is generally desirable to enhance precision of the abnormality determination. It is desirable to provide an abnormality determination device and an abnormality determination method of a lock up clutch that make it possible to enhance precision of an abnormality determination.

In the following, some implementations of the disclosure are described in detail with reference to the accompanying drawings. The description is given in the following order.
1. First Implementation (an example where no determination as to presence or absence of an abnormality is made in a case of a fuel non-cut state)
2. Second Implementation (an example where a determination as to the presence or the absence of the abnormality is made in the case of the fuel non-cut state as well, with some exceptions)
3. Third Implementation (an example where the determination as to the presence or the absence of the abnormality is made constantly)
4. Modification Example Common to First to Third Implementations (an example in further consideration of a determination regarding occurrence of an engine stall in a stopped state of a vehicle)
5. Other Modification Examples Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same numerals to avoid redundant description.

1. First Implementation (Outline Configuration of Vehicle 1)

Figure 1:
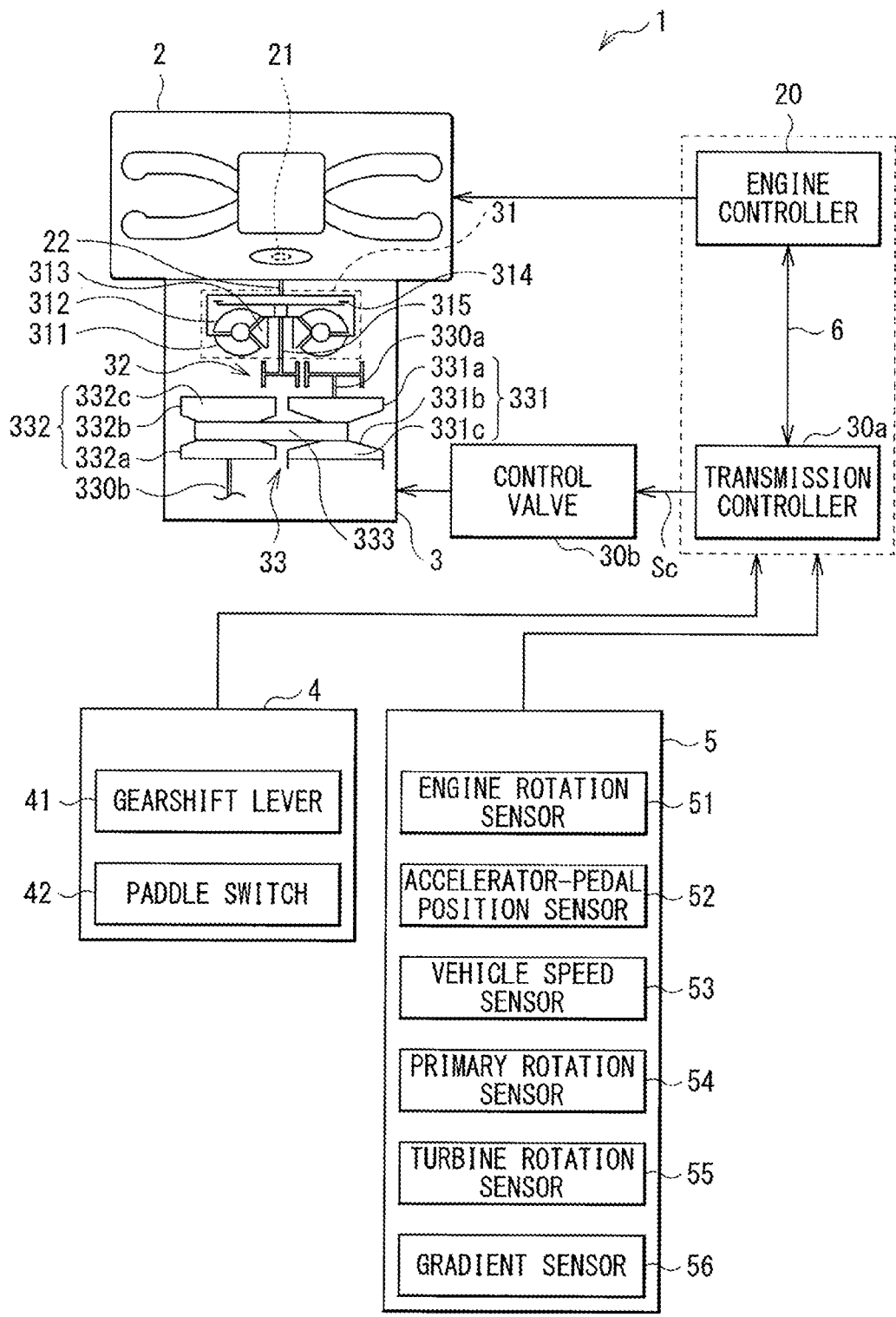
FIG. 1 is a block diagram illustrating an outline configuration example of a vehicle that incorporates an abnormality determination device according to a first implementation of the disclosure.

FIG. 1 schematically illustrates an outline configuration example of a vehicle including an abnormality determination device according to a first implementation of the disclosure, i.e., a transmission controller 30a described later. It is to be noted that FIG. 1 illustrates an extract of a configuration of a main portion related to the disclosure, from the configuration of the entire vehicle 1. The outline configuration of the vehicle 1 in the first implementation also applies to other example implementations described later, e.g., second and third implementations and modification examples.

The vehicle 1 may be, for example, a four-wheel automobile. The vehicle 1 may include, for example, an engine 2, an automatic transmission 3, an engine controller 20, the transmission controller 30a, a control valve 30b, operators 4, sensors 5, and a bus 6.

(A. Engine 2)

The engine 2 may generate motive power of the vehicle 1, and include various kinds of internal combustion engines. In one specific but non-limiting example, the engine 2 may include, for example, a horizontally opposed four cylinder gasoline engine. It is to be noted that the engine 2 may be of other types. For example, the engine 2 may be, for example, a V gasoline engine. In another alternative, the engine 2 may be a diesel engine instead of a gasoline engine.

As illustrated in FIG. 1, the engine 2 may include a crankshaft 21 and an output shaft 22. The crankshaft 21 may be a shaft that converts reciprocating movement of a piston inside the engine 2 into rotational power. The rotation of the crankshaft 21 may be transmitted to the output shaft 22. Thus, the rotation may be transmitted from the engine 2 to inside the automatic transmission 3, i.e., a rotating member on input side described later.

(B. Automatic Transmission 3)

The automatic transmission 3 may be a mechanism that transmits the motive power generated in the engine 2 to each of drive wheels with a transmission ratio adapted for travel of the vehicle 1. In the example illustrated in FIG. 1, the automatic transmission 3 may include a stepless transmission, i.e., a continuously variable transmission (CVT). Moreover, in this example, the automatic transmission 3 may include a chain type CVT, but the automatic transmission 3 may include a CVT of other types, e.g., a belt type. Furthermore, the automatic transmission 3 is not limited to the stepless transmission as mentioned above, but the automatic transmission 3 may include a stepped transmission.

As illustrated in FIG. 1, the automatic transmission 3 as mentioned above may include a torque converter 31, a reduction gear 32, and a stepless transmission mechanism 33.

(B-1. Torque Converter 31)

The torque converter 31 may be a mechanism that transmits the motive power outputted from the engine 2 to the stepless transmission mechanism 33. The torque converter 31 may have a clutch function and a function of torque amplification. As illustrated in FIG. 1, the torque converter 31 may include a pump impeller 311, a turbine runner 312, a stator 313, a lock up clutch 314, and an output shaft 315.

The pump impeller 311 may be a member that transmits the motive power through a working fluid inside the torque converter 31. The pump impeller 311 may generate a flow of the working fluid. The turbine runner 312 may be disposed at a confronted position with the pump impeller 311. The turbine runner 312 may be a member that transmits the motive power with the utilization of the flow of the working fluid generated by the pump impeller 311. The stator 313 may be disposed between the pump impeller 311 and the turbine runner 312. The stator 313 may rectify an exhaust flow, i.e., a return, from the turbine runner 312 and restore the rectified flow to the pump impeller 311, to generate an action of torque amplification.

In one implementation, the pump impeller 311 may serve as a "rotating member on input side". In one implementation, the turbine runner 312 may serve as a "rotating member on output side". More details are to be described later.

The lock up clutch 314 may be a clutch that is able to set the input side and the output side in the torque converter 31 at a directly linked state. In one specific but non-limiting example, the lock up clutch 314 may be able to link the pump impeller 311 as the rotating member on the input side with the turbine runner 312 as the rotating member on the output side. Such linkage provided by the lock up clutch 314 may cause unitary rotation of the pump impeller 311 and the turbine runner 312, transmitting an output of the engine 2 from the turbine runner 312 to post-stage mechanisms, e.g., the reduction gear 32 and the stepless transmission mechanism 33 described later.

In what follows, a state in which the lock up clutch 314 is in operation (with maximum lock up pressure), to permit the linkage, i.e., the unitary rotation at the same rotation speed, between the rotating member on the input side, i.e., the pump impeller 311, and the rotating member on the output side, i.e., the turbine runner 312, in the torque converter 31 is referred to as an "engaged state" or a "lock up state". A state in which the lock up clutch 314 is out of operation, to interrupt the linkage between the rotating member on the input side and the rotating member on the output side, i.e., to disconnect their linkage completely, is referred to as a "disengaged state".

In this way, the torque converter 31 may perform the torque amplification of drive power of the engine 2, when the lock up clutch 314 is set at the disengaged state. Thus, the torque converter 31 may transmit the amplified drive power toward the reduction gear 32 through the output shaft 315 of the torque converter 31. Meanwhile, when the lock up clutch 314 is set at the engaged state, the torque converter 31 may directly transmit the drive power of the engine 2 toward the reduction gear 32 through the output shaft 315.

(B-2. Stepless Transmission Mechanism 33)

As illustrated in FIG. 1, the stepless transmission mechanism 33 may include a primary shaft 330a, a primary pulley 331, a secondary pulley 332, a chain 333, and a secondary shaft 330b.

The primary shaft 330a may be coupled to the output shaft 315 of the torque converter 31 through the reduction gear 32. The secondary shaft 330b may be disposed in parallel to the primary shaft 330a.

The primary pulley 331 may include a fixed sheave 331a and a movable sheave 331b. The fixed sheave 331a may be joined to the primary shaft 330a. The movable sheave 331b may be confronted with the fixed sheave 331a, and be held slidably in an axial direction of the primary shaft 330a. An interval between conical surfaces of the fixed sheave 331a and the movable sheave 331b, i.e., a pulley groove width, may be changeable.

The secondary pulley 332 may include a fixed sheave 332a and a movable sheave 332b. The fixed sheave 332a may be joined to the secondary shaft 330b. The movable sheave 332b may be confronted with the fixed sheave 332a, and be held slidably in an axial direction of the secondary shaft 330b. An interval between conical surfaces of the fixed sheave 332a and the movable sheave 332b, i.e., a pulley groove width, may also be changeable.

The chain 333 may be routed around the primary pulley 331 and the secondary pulley 332. The chain 333 may be a member that transmits the motive power. Changing the pulley groove widths as mentioned above of the primary pulley 331 and the secondary pulley 332 causes a change in a pulley ratio, i.e., a ratio of wrap diameters of the chain 333 around the primary pulley 331 and the secondary pulley 332. The change in the pulley ratio allows the transmission ratio to change steplessly. Assuming that Rp denotes the wrap diameter of the chain 333 around the primary pulley 331, and Rs denotes the wrap diameter of the chain 333 around the secondary pulley 332, the transmission ratio i may be represented by an expression: $i=(Rs/Rp)$.

As illustrated in FIG. 1, the primary pulley 331, i.e., the movable sheave 331b, may be provided with a hydraulic chamber 331c. The secondary pulley 332, i.e., the movable sheave 332b, may be provided with a hydraulic chamber 332c. The pulley groove width as mentioned above of the primary pulley 331 may be controlled by adjusting primary hydraulic pressure to be introduced into the hydraulic chamber 331c. The pulley groove width as mentioned above of the secondary pulley 332 may be controlled by adjusting secondary hydraulic pressure to be introduced into the hydraulic chamber 332c.

It is to be noted that the motive power transmitted toward the secondary pulley 332 may be finally transmitted to each of the drive wheels of the vehicle 1, through the predetermined post-stage mechanisms in the automatic transmission 3.

(C. Operators 4)

The operators 4 may comprehensively represent various kinds of operators provided in the vehicle 1. As illustrated in FIG. 1, non-limiting examples of the operators that belong to the operators 4 may include a gearshift lever 41 and a paddle switch 42.

The gearshift lever 41 may be provided on, for example, a floor, or a center console, of the vehicle 1. The gearshift lever 41 may be an operator that allows a driver of the vehicle 1 to be able to make an alternative switching operation between an automatic transmission mode, i.e., a "D" range, and a manual transmission mode, i.e., an "M" range. It is to be noted that the gearshift lever 41 as described above may allow for selective switching of, for example, a parking ("P") range, a reverse ("R") range, and a neutral ("N") range, in addition to the "D" range and the "M" range as mentioned above.

The paddle switch 42 may be provided on a steering wheel of the vehicle 1. The paddle switch 42 may be an operator that allows the driver of the vehicle 1 to make a transmission operation, or a transmission request. The driver's operation of the paddle switch 42 makes it possible to make an upshift request and a downshift request. The upshift request is a request for a shift toward a higher transmission ratio. The downshift request is a request for a shift toward a lower transmission ratio.

In the operators 4 as mentioned above, obtained may be operation input signals for each operator. The operation input signals may be supplied to, for example, the engine controller 20 and the transmission controller 30a described later, as illustrated in FIG. 1.

(D. Sensors 5)

The sensors 5 may comprehensively represent various kinds of sensors provided in the vehicle 1. In this example, as illustrated in FIG. 1, non-limiting examples of the sensors that belong to the sensors 5 may include an engine rotation sensor 51, an accelerator-pedal position sensor 52, a vehicle speed sensor 53, a primary rotation sensor 54, a turbine rotation sensor 55, and a gradient sensor 56.

The engine rotation sensor 51 may be a sensor that detects the number of rotations of the engine 2, i.e., the number of engine rotations Ne, on the basis of a change in a rotation position of the crankshaft 21. The accelerator-pedal position sensor 52 may be a sensor that detects an accelerator-pedal position. The accelerator-pedal position represents an amount of stepping down of an accelerator pedal in the vehicle 1. The vehicle speed sensor 53 may be a sensor that detects a vehicle speed, i.e., a travel speed of the vehicle 1. The primary rotation sensor 54 may be a sensor that detects the number of rotations of the primary pulley 331. The turbine rotation sensor 55 may be a sensor that detects the number of rotations of the turbine runner 312, i.e., the number of turbine rotations Nt. The gradient sensor 56 may be a sensor that detects a gradient of a path to be traveled by the vehicle 1.

In the sensors 5 as described above, obtained may be detection signals by each sensor. The detection signals may be supplied to, for example, the engine controller 20 and the transmission controller 30*a* described later, as illustrated in FIG. 1.

(E. Control Valve 30*b*)

The control valve 30*b* may control, in accordance with instructions from the transmission controller 30*a* described later, hydraulic pressure that causes transmission by the automatic transmission 3, i.e., the primary hydraulic pressure and the secondary hydraulic pressure as mentioned above.

The control valve 30*b* may include, a spool valve, i.e., a hydraulic switching valve, and a solenoid valve that moves the spool valve. With the use of the spool valve and the solenoid valve, the control valve 30*b* may open and close hydraulic paths formed inside a valve body, to adjust hydraulic pressure discharged from an oil pump. Thus, the control valve 30*b* may supply the adjusted hydraulic pressure to the hydraulic chambers 331*c* and 332*c* as mentioned above.

Moreover, the control valve 30*b* may also perform adjustment of hydraulic pressure that allows for a control of the lock up pressure in the lock up clutch 314 as mentioned above.

(F. Engine Controller 20 and Transmission Controller 30*a*)

The engine controller 20 and the transmission controller 30*a* may include, for example, a microcomputer. The microcomputer may be provided with, for example, a central processing unit (CPU), a read only memory (ROM), and a random access memory (RAM). As illustrated in FIG. 1, the engine controller 20 and the transmission controller 30*a* may be so coupled through the bus 6 as to be able to perform data communication with one another. The bus 6 may be in conformity with a predetermined on-vehicle network communication standard, e.g., a controller area network (CAN).

(F-1. Engine Controller 20)

The engine controller 20 may perform various kinds of drive controls of the engine 2, e.g., a fuel injection control, an ignition control, and an intake air amount adjustment control. In one specific but non-limiting example, the engine controller 20 may control various kinds of actuators provided in the engine 2, to perform the various kinds of the drive controls of the engine 2. Non-limiting examples of the actuators may include a throttle actuator that drives a throttle valve, and an injector that performs fuel injection.

Moreover, the engine controller 20 may communicate with the transmission controller 30*a*, as mentioned above. Thus, the engine controller 20 may supply, as necessary, various kinds of data regarding driving states of the engine 2 to the transmission controller 30*a*. Non-limiting examples of the data may include information regarding a fuel cut state described later. Furthermore, the engine controller 20 may perform the various kinds of the drive controls of the engine 2, on the basis of various signals supplied, as necessary, from the transmission controller 30*a*.

(F-2. Transmission Controller 30*a*)

The transmission controller 30*a* may output a control signal Sc illustrated in FIG. 1, to control drive of the solenoid valve that constitutes the control valve 30*b* as mentioned above. Thus, the transmission controller 30*a* may control operation of the automatic transmission 3. In one specific but non-limiting example, the transmission controller 30*a* may adjust the hydraulic pressure to be supplied to the hydraulic chambers 331*c* and 332*c* as mentioned above, to change the transmission ratio in the automatic transmission 3.

Moreover, the transmission controller 30*a* may perform the adjustment of the hydraulic pressure that allows for the control of the lock up pressure in the lock up clutch 314 as mentioned above. Thus, the transmission controller 30*a* may perform a control that includes setting the lock up clutch 314 at the engaged state or the disengaged state as mentioned above. In other words, the transmission controller 30*a* is configured to set the lock up clutch 314 at the engaged state or the disengaged state. The engaged state includes permitting the linkage between the rotating member on the input side, i.e., the pump impeller 311, and the rotating member on the output side, i.e., the turbine runner 312. The disengaged state includes interrupting the linkage between the rotating members.

Furthermore, the transmission controller 30*a* may have a function of performing an abnormality determination regarding the lock up clutch 314 as mentioned above. In one specific but non-limiting example, the transmission controller 30*a* may determine presence or absence of an abnormality in the lock up clutch 314. The abnormality corresponds to a situation that the lock up clutch 314 is stuck in the engaged state, i.e., a situation that the lock up clutch 314 fails in making a transition from the engaged state to the disengaged state. Details are described later, with reference to FIGS. 2 to 4, of causes of the abnormality regarding the lock up clutch 314 and a function of the abnormality determination, i.e., an abnormality determination method.

In one implementation, the transmission controller 30*a* may serve as an "abnormality determination device" of a lock up clutch, a "controller", and a "determining unit".

(Operation, Workings, and Effects)

(A. Regarding Abnormality in Lock Up Clutch)

In the automatic transmission 3 in the vehicle 1, as illustrated in FIG. 1, operation of the lock up clutch 314 in the torque converter 31 may be controlled by the transmission controller 30*a*, through the control valve 30*b*. Thus, as described above, provided may be setting of the engaged state and the disengaged state between the rotating member on the input side, i.e., the pump impeller 311, and the rotating member on the output side, i.e., the turbine runner 312. Setting the engaged state in accordance with traveling situations of the vehicle 1 makes it possible to enhance transmission efficiency of the motive power to be transmitted from the engine 2 to the automatic transmission 3, and to enhance fuel consumption performance in the vehicle 1.

The lock up clutch 314 has possibility that, as described above, the abnormality occurs in which the lock up clutch 314 becomes stuck in the engaged state, failing in making the transition to the disengaged state. Such an abnormality may be caused by, for example, a failure in the solenoid valve or the spool valve, i.e., the hydraulic switching valve, included in the control valve 30*b*. Alternatively, such an abnormality may be caused by, for example, a failure in the lock up clutch 314 itself. Specific but non-limiting examples of the failure may include a mechanical malfunction in the solenoid valve, disconnection of a line for a signal input to the solenoid valve, a seizure of the spool valve, and a seizure of the lock up clutch 314 itself. Because of these failures, possibility may arise that the lock up clutch 314 fails in making the transition to the disengaged state, regardless of an instruction for disengagement.

(B. Abnormality Determination Method of Comparative Example)

A comparative example of an abnormality determination method regarding the lock up clutch 314 may be as follows. In the abnormality determination method of the comparative example includes determining presence of an abnormality in the lock up clutch 314, i.e., determining that the lock up clutch 314 is in an abnormal state, in a case where the following determination conditions (A) and (B) are both established.

(Determination Condition (A))

First, in the abnormality determination method of the comparative example, a determination may be made that the determination condition (A) is established in a case where a difference in the number of rotations Dn does not become larger than a predetermined value, with a disengagement instruction having been given to the lock up clutch 314. The difference in the number of rotations Dn is a difference in the number of rotations between the number of engine rotations Ne and the number of turbine rotations Nt as mentioned above. In one specific but non-limiting example, the determination may be made that the determination condition (A) is established in a case where the following condition is satisfied: deceleration of the vehicle 1 on travel with the lock up clutch 314 in the engaged state causes the forgoing disengagement instruction to be given, on which occasion a lock up duty is equal to or smaller than 30% ($\leq$30%) for a lapse of time of 0.1 second, and thereafter, the difference in the number of rotations Dn is equal to or smaller than 100 ($\leq$100) (rpm) for a duration of time of 0.05 second.

(Determination Condition (B))

Thereafter, in the abnormality determination method of the comparative example, a determination may be made that the determination condition (B) is established in a case where an engine stall state has occurred in a stopped state of the vehicle 1. In one specific but non-limiting example, the determination may be made that the determination condition (B) is established in a case where the following condition is satisfied: the vehicle speed, i.e., the travel speed of the vehicle 1, is equal to or smaller than 1 ($\leq$1) (km/h) for a duration of time of 1 second, and the lock up duty is equal to or smaller than 0% ($\leq$0%) for a lapse of time of 1 second, and thereafter, the number of engine rotations Ne is equal to or smaller than 400 ($\leq$400) (rpm) for a duration of time of 1 second.

The abnormality determination method of the comparative example, however, may cause, for example, the following disadvantage, resulting in possibility of insufficient precision of the abnormality determination.

In one specific but non-limiting example, first, timing of generation of the difference in the number of rotations Dn of a predetermined value or larger in the lock up clutch 314 is generally influenced by, for example, variations in traveling states of the vehicle 1, e.g., warming up and deceleration, and/or individual differences in members inside the vehicle 1. However, the determination condition (A) as mentioned above takes no consideration of such variations in the setting of, for example, the threshold for the determination of the difference in the number of rotations Dn. In other words, the threshold is set at a fixed value. Accordingly, there is possibility of an erroneous determination, in making the determination as to the determination condition (A). If the determination condition (A) were established by such an erroneous determination, occurrence of the engine stall state in the stopped state of the vehicle 1 would establish the forgoing determination condition (B), resulting in an erroneous determination as the whole abnormality determination of the lock up clutch 314. Thus, the abnormality determination method of the comparative example has possibility of lowered precision of the abnormality determination.

Moreover, let us consider a case where the disengagement instruction has been given to the lock up clutch 314, but, for example, the engine 2 is out of the fuel cut state. The fuel cut state is a state devoid of fuel supply to the engine 2, i.e., the fuel non-cut state. In this case, there is possibility of a disadvantage as follows. In the fuel non-cut state, even if the lock up clutch 314 is disengaged, the presence of combustion weakens power that lowers the number of engine rotations. This hinders the difference in the number of rotations Dn from increasing easily, because of balance between the weakened power and dragging torque of the converter fluid. Accordingly, the possibility of the erroneous determination also arises in making the determination as to the determination condition (A). In this respect as well, the abnormality determination method of the comparative example results in the possibility of the lowered precision of the abnormality determination.

(C. Abnormality Determination Method of First Implementation: Example 1)

An abnormality determination method of this implementation, therefore, uses a technique described in detail below. For example, the abnormality determination method of this implementation uses a technique of allowing a threshold Dnth of the difference in the number of rotations Dn to take a value that varies with, for example, a rate of deceleration De of the vehicle 1, instead of a fixed value. The threshold Dnth is described later. In this way, in the abnormality determination method of this implementation, it is possible to enhance precision of the abnormality determination, as compared to the abnormality determination method of the comparative example.

In the following, described in detail is an example, i.e., Example 1, of the abnormality determination method of the lock up clutch 314 in this implementation, with reference to FIGS. 2 to 4 in addition to FIG. 1.

Figure 2:
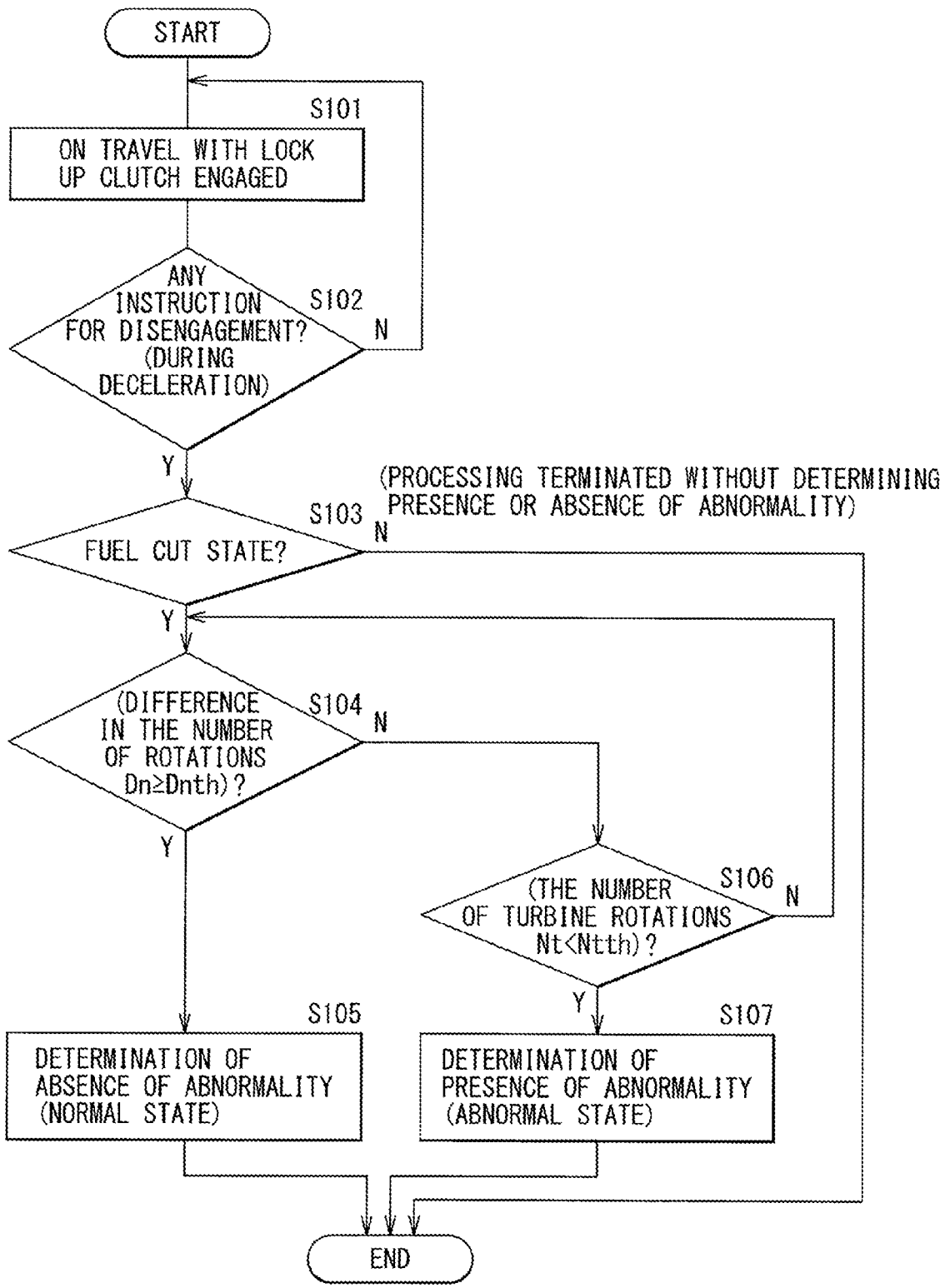
FIG. 2 is a flowchart illustrating an example, i.e., Example 1, of an abnormality determination method according to the first implementation.
Figure 3A:
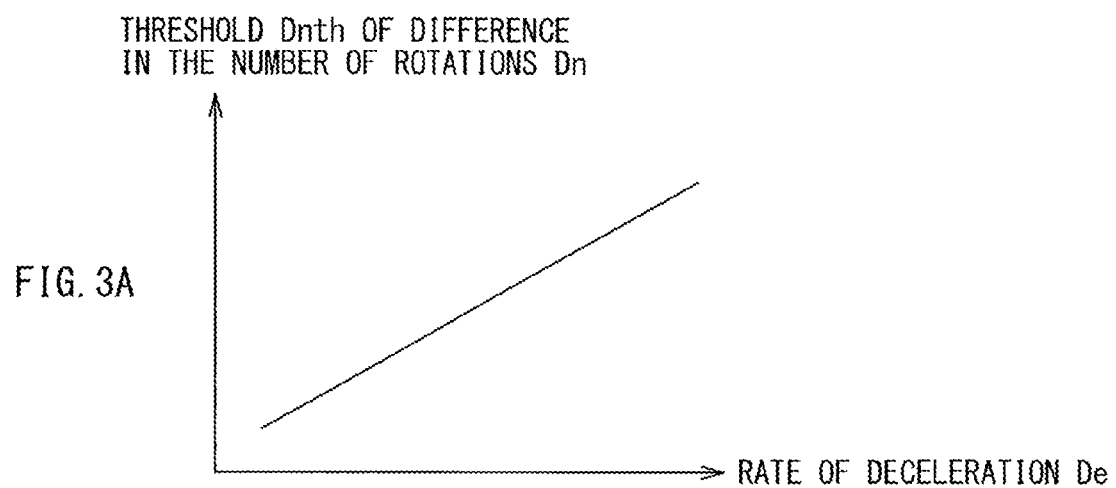
FIG. 3A is a conceptual diagram illustrating schematically an example of corresponding relation between a threshold illustrated in FIG. 2 and a rate of deceleration of the vehicle.
Figure 3B:
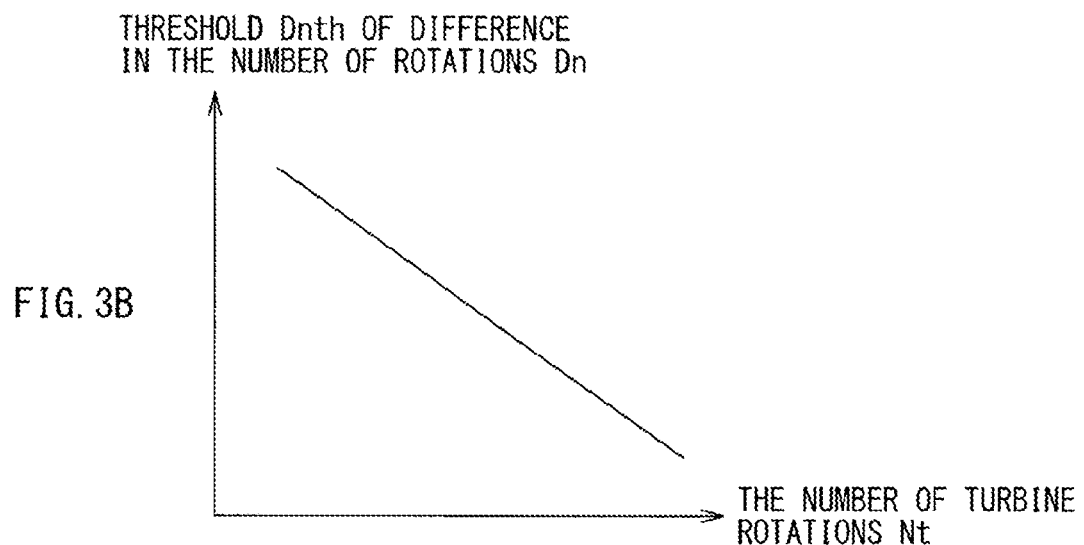
FIG. 3B is a conceptual diagram illustrating schematically an example of corresponding relation between the threshold illustrated in FIG. 2 and the number of turbine rotations.
Figure 3C:
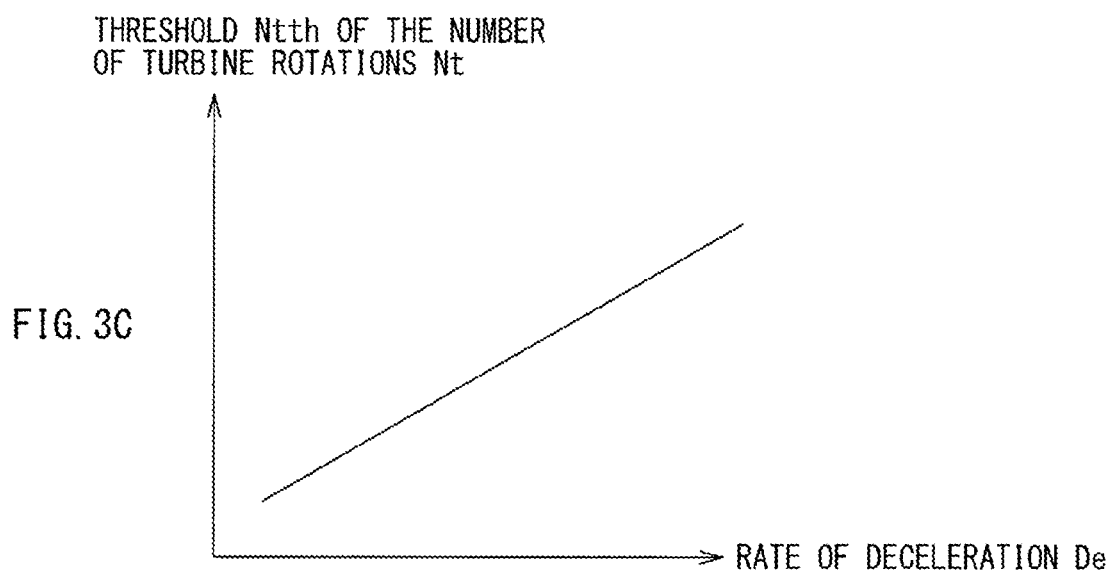
FIG. 3C is a conceptual diagram illustrating schematically an example of corresponding relation between a threshold illustrated in FIG. 2 and the rate of deceleration.

FIG. 2 illustrates, in the form of a flowchart, the example, i.e., Example 1, of the abnormality determination method of this implementation. FIG. 3A schematically illustrates, in the form of a conceptual diagram, an example of corresponding relation between a threshold illustrated in FIG. 2, i.e., the threshold Dnth described later, and the rate of deceleration De of the vehicle 1 described later. FIG. 3B schematically illustrates, in the form of a conceptual diagram, an example of corresponding relation between the threshold illustrated in FIG. 2, i.e., the threshold Dnth, and the number of turbine rotations Nt. FIG. 3C schematically illustrates, in the form of a conceptual diagram, an example of corresponding relation between a threshold illustrated in FIG. 2, i.e., a threshold Ntth described later, and the rate of deceleration De of the vehicle 1. FIGS. 4A, 4B, and 4C schematically illustrate an example of corresponding relation between a time change characteristic of the difference in the number of rotations Dn between the number of engine rotations Ne and the number of turbine rotations Nt, and the rate of deceleration De. It is to be noted that the conceptual diagrams of the examples of the corresponding relation illustrated in FIGS. 3A to 3C are provided only for purposes of convenience for easier description. The examples of the corresponding relation, i.e., examples of a variation mode, are not limited to as illustrated, but may be of other variation modes. The examples of the corresponding relation illustrated in FIGS. 4A to 4C are based on an assumption that the lock up clutch 314 becomes stuck in the engaged state.

In the abnormality determination method of this implementation, first, in a case where the vehicle 1 is on travel with the lock up clutch 314 in the engaged state (step S101 in FIG. 2), the transmission controller 30a, which may serve as the "determining unit" in one implementation, may make a determination as follows. Specifically, the transmission controller 30a may determine whether or not the deceleration of the vehicle 1 has satisfied a predetermined condition, e.g., a vehicle speed condition or a deceleration rate condition, causing the disengagement instruction to be given to the lock up clutch 314 (step S102). In other words, the transmission controller 30a may determine presence or absence of an instruction to make the transition to the disengaged state. Specifically, the transmission controller 30a may determine presence or absence of the control signal Sc outputted to the lock up clutch 314, on the basis of, for example, information such as the vehicle speed detected in the vehicle speed sensor 53. The control signal Sc indicates the instruction to make the transition to the disengaged state. In a case with a determination of the absence of the instruction to make the transition to the disengaged state, i.e., in a case with a determination of the absence of the disengagement instruction (step S102: N), the processing may return to step S101 again.

In a case with a determination of the presence of the instruction to make the transition to the disengaged state, i.e., in a case with a determination of the presence of the disengagement instruction (step S102: Y), the transmission controller 30a may, thereafter, make a determination as follows. Specifically, the transmission controller 30a may determine whether or not the engine 2 is in the fuel cut state as mentioned above (step S103). At this occasion, the transmission controller 30a may determine whether or not the engine 2 is in the fuel cut state by, for example, acquiring a predetermined signal from the engine controller 20.

In a case where the engine 2 is determined as being out of the fuel cut state (step S103: N), in this implementation, a series of processing illustrated in FIG. 2, i.e., abnormality determination processing, may be terminated, without determining the presence or the absence of the abnormality in the lock up clutch 314. One reason is as follows. In the case where the engine 2 is out of the fuel cut state, i.e., in the case where the engine 2 is in the fuel non-cut state, the difference in the number of rotations Dn does not increase easily, as described above. This causes possibility of an erroneous determination in step S104 described below. More details are described later.

In a case where the engine 2 is determined as being in the fuel cut state (step S103: Y), the transmission controller 30a may, thereafter, determine whether or not the difference in the number of rotations Dn between the number of engine rotations Ne and the number of turbine rotations Nt is equal to or larger than the threshold Dnth (step S104). In other words, the transmission controller 30a may determine whether or not the difference in the number of rotations Dn satisfies Dn≥Dnth. At this occasion, the transmission controller 30a may make such a determination by performing predetermined operation processing on the basis of, for example, information regarding the number of engine rotations Ne detected in the engine rotation sensor 51 and information regarding the number of turbine rotations Nt detected in the turbine rotation sensor 55.

In a case where the difference in the number of rotations Dn is determined as being equal to or larger than the threshold Dnth (step S104: Y), a determination may be made that the lock up clutch 314 has made the transition to the disengaged state. Accordingly, the transmission controller 30a may determine the absence of the abnormality in the lock up clutch 314 (step S105). In other words, the transmission controller 30a may determine that the lock up clutch 314 is in a normal state. Thus, the series of the abnormality determination processing illustrated in FIG. 2 may be terminated. In a case where the difference in the number of rotations Dn is determined as being smaller than the threshold Dnth (step S104: N), a determination may be made that the lock up clutch 314 has not made the transition to the disengaged state. Thus, the processing may proceed to subsequent step S106.

The threshold Dnth as mentioned above may be the difference in the number of rotations Dn corresponding to an amount on the basis of which a determination is to be made that the lock up clutch 314 has made the transition to the disengaged state. In this implementation, the threshold Dnth may be a variable value that varies with the rate of deceleration De of the vehicle 1. Moreover, in this implementation, the threshold Dnth may further vary with the number of turbine rotations Nt as well.

In one specific but non-limiting example, as illustrated in FIG. 3A, the threshold Dnth may be set to become gradually larger as the rate of deceleration De becomes higher. Meanwhile, as illustrated in, for example, FIG. 3B, the threshold Dnth may be set to become gradually larger as the number of turbine rotations Nt becomes smaller. One reason is as follows. As illustrated in, for example, FIGS. 4A, 4B, and 4C, the difference in the number of rotations Dn between the number of engine rotations Ne and the number of turbine rotations Nt, i.e., the difference in the number of rotations Dn with which the lock up clutch 314 becomes stuck in the engaged state, generally has a tendency to increase as the rate of deceleration De becomes higher, while becoming gradually larger as the number of turbine rotations Nt becomes smaller. It is to be noted that the difference in the number of rotations Dn is not brought to zero (0) even when the lock up clutch 314 becomes stuck in the engaged state.

In one implementation, the threshold Dnth may serve as a "first threshold".

Description now returns to step S106 in FIG. 2 as mentioned above. In step S106, the transmission controller 30a may determine whether or not the number of turbine rotations Nt is smaller than the threshold Ntth. In other words, the transmission controller 30a may determine whether or not the number of turbine rotations Nt satisfies Nt<Ntth.

The threshold Ntth may correspond to a value that is formally maintained while the number of engine rotations Ne lowers. In other words, the threshold Ntth may correspond to an apparent value that is operationally constant, regardless of variations in the actual number of rotations of the engine 2. In this implementation, as with the forgoing threshold Dnth, the threshold Ntth may be a variable value that varies with the rate of deceleration De of the vehicle 1.

In one specific but non-limiting example, as illustrated in FIG. 3C, the threshold Ntth may be set to become gradually larger as the rate of deceleration De becomes higher. One reason is as follows. As illustrated in, for example, FIGS. 4A, 4B, and 4C, the threshold Ntth generally has a tendency to increase as the rate of deceleration De becomes higher. As mentioned above, the threshold Ntth may be the number of rotations in a clipped state in which the number of engine rotations Ne is formally maintained. Refer to reference characters P1, P2, and P3.

In one implementation, the threshold Ntth may serve as a "second threshold".

In a case where the number of turbine rotations Nt is determined as being equal to or larger than the threshold Ntth (step S106: N), the processing may return to step S104. In step S104, the determination may be made again as to whether or not the difference in the number of rotations Dn is equal to or larger than the threshold Dnth. In other words, the transmission controller 30a may perform the abnormality determination after keeping on monitoring whether or not the lock up clutch 314 has made the transition to the disengaged state, i.e., whether or not the difference in the number of rotations Dn has become equal to or larger than the threshold Dnth, until just before the number of engine rotations Ne is brought to the clipped state as mentioned above.

In a case where the number of turbine rotations Nt is determine as being smaller than the threshold Ntth (step S106: Y), the transmission controller 30a may determine the presence of the abnormality in the lock up clutch 314 (step S107). In other words, the transmission controller 30a may determine that the lock up clutch 314 is in an abnormal state. Thus, the series of the abnormality determination processing illustrated in FIG. 2 may be terminated. It is to be noted that in the case with the determination of the presence of the abnormality in the lock up clutch 314 as described above, the transmission controller 30a and/or the engine controller 20 may, for example, record information regarding such an abnormality, while giving a notification of occurrence of the abnormality. The notification may be made with the utilization of, for example, characters, pictures, and/or sound.

(D. Workings and Effects)

As described, in this implementation, the deceleration of the vehicle 1 on travel with the lock up clutch 314 in the engaged state causes the transmission controller 30a to output the control signal Sc that causes the lock up clutch 314 to make the transition to the disengaged state, on which occasion the transmission controller 30a determines the presence or the absence of the forgoing abnormality in the lock up clutch 314, as follows. The transmission controller 30a determines the presence or the absence of the abnormality on the basis of a determination result as to whether or not the difference in the number of rotations Dn is equal to or larger than the threshold Dnth. The threshold Dnth varies with the rate of deceleration De of the vehicle 1. Refer to step S104 in FIG. 2 and FIG. 3A.

Accordingly, in this implementation, unlike the comparative example, influences of the traveling state of the vehicle 1, i.e., the rate of deceleration De, is taken into consideration in making the determination regarding the difference in the number of rotations Dn. This leads to lowered possibility of the erroneous determination. Hence, in this implementation, it is possible to enhance the precision of the abnormality determination in the lock up clutch 314, as compared to the comparative example.

Moreover, in this implementation, the threshold Dnth may be set to become larger as the rate of deceleration De becomes higher. Refer to FIG. 3A. This makes it possible to set the threshold Dnth adapted for the tendency of the variations in the difference in the number of rotations Dn. For the tendency, refer to FIGS. 4A to 4C. Hence, it is possible to lower the possibility of the erroneous determination more, leading to more enhanced precision of the abnormality determination.

Furthermore, in this implementation, the threshold Dnth may vary with the number of turbine rotations Nt as well. Refer to FIG. 3B. This makes it possible to adapt the setting of the threshold Dnth even more for the general tendency of the variations in the difference in the number of rotations Dn. For the tendency, refer to FIGS. 4A to 4C. Hence, it is possible to lower the possibility of the erroneous determination even more, leading to even more enhanced precision of the abnormality determination.

In addition, in this implementation, in the case where the difference in the number of rotations Dn is determined as being equal to or larger than the threshold Dnth, the transmission controller 30a may determine the absence of the abnormality in the lock up clutch 314. In the case where the difference in the number of rotations Dn is determined as being smaller than the threshold Dnth, the transmission controller 30a may determine the presence or the absence of the abnormality in accordance with the determination result as to whether or not the number of turbine rotations Nt is smaller than the threshold Ntth that varies with the rate of deceleration De. Refer to steps S104 to S106 in FIG. 2. As described, the abnormality determination may be made after keeping on monitoring whether or not the lock up clutch 314 has made the transition to the disengaged state until just before the number of engine rotations Ne is brought to the forgoing clipped state. It follows, therefore, that it is possible to make the determination regarding the difference in the number of rotations Dn, with a region of the number of rotations as a target of the determination enlarged to its maximum, while excluding a region with lowered reliability of the number of engine rotations Ne (i.e., the region in which the number of engine rotations Ne is brought to the clipped state: refer to the reference characters P1 to P3 in FIGS. 4A to 4C.). Moreover, the threshold Ntth of the number of turbine rotations Nt may vary with the rate of deceleration De. Refer to FIG. 3C. This makes it possible to set the threshold Ntth adapted for the general tendency of the change in the number of turbine rotations Nt. For the tendency, refer to FIGS. 4A to 4C. Hence, in this implementation, it is possible to lower the possibility of the erroneous determination more, leading to more enhanced precision of the abnormality determination.

Moreover, in this implementation, the threshold Ntth may become larger as the rate of deceleration De becomes higher. Refer to FIG. 3C. This makes it possible to set the threshold Ntth adapted for the general tendency of the change in the number of turbine rotations Nt. For the tendency, refer to FIGS. 4A to 4C. Hence, it is possible to lower the possibility of the erroneous determination even more, leading to even more enhanced precision of the abnormality determination.

In addition, in this implementation, the transmission controller 30a may determine the presence or the absence of the abnormality in further consideration of the determination result as to whether or not the engine is in the fuel cut state when the control signal Sc is outputted, i.e., at the start of the disengagement instruction. The control signal Sc causes the transition to the disengaged state. For the determination result, refer to step S103 in FIG. 2. From the forgoing, the processing may be as follows. First, in the case where the engine is out of the fuel cut state at the start of the disengagement instruction, the difference in the number of rotations Dn does not increase easily, as mentioned above. In the comparative example, the abnormality determination is made without consideration of the fuel cut state at the start of the disengagement instruction. Accordingly, the comparative example has the possibility of the lowered precision of the abnormality determination, as mentioned above. In contrast, in this implementation, the abnormality determination may be made in consideration of the fuel cut state at the start of the disengagement instruction. Hence, it is possible to lower the possibility of the erroneous determination, as compared to the forgoing comparative example, in making the determination regarding the difference in the number of rotations Dn in step S104 in FIG. 2. This leads to more enhanced precision of the abnormality determination.

Moreover, in this implementation, in the case where the engine is determined as being in the fuel cut state at the start of the disengagement instruction, the transmission controller 30a may determine the presence or the absence of the abnormality. In the case where the engine is determined as being out of the fuel cut state at the start of the disengagement instruction, the transmission controller 30a may refrain from determining the presence or the absence of the abnormality. Refer to step S103 in FIG. 2. In other words, in this implementation, the transmission controller 30a may determine the presence of the abnormality solely in the case where the number of turbine rotations Nt is determined as being smaller than the threshold Ntth. Refer to steps S106 and S107 in FIG. 2. As described, this implementation may include keeping from determining the presence or the absence of the abnormality in the case of the fuel non-cut state that involves the possibility of the erroneous determination. Hence, it is possible to enhance the precision of the abnormality determination more optimally, as compared to, for example, second and third implementations described later.

Description now moves on to other implementations of the disclosure, i.e., the second and the third implementations. The second and the third implementations are the same as the first implementation (Refer to FIG. 2) in terms of the configuration of the vehicle 1 illustrated in FIG. 1. The second and the third implementations are different from the first implementation in terms of a portion of the abnormality determination processing. Accordingly, in the second and the third implementations, the same constituent elements as those in the forgoing first implementation are denoted by the same reference characters, and description thereof is omitted as appropriate.

2. Second Implementation (A. Abnormality Determination Method of Second Implementation: Example 2)

Figure 5:
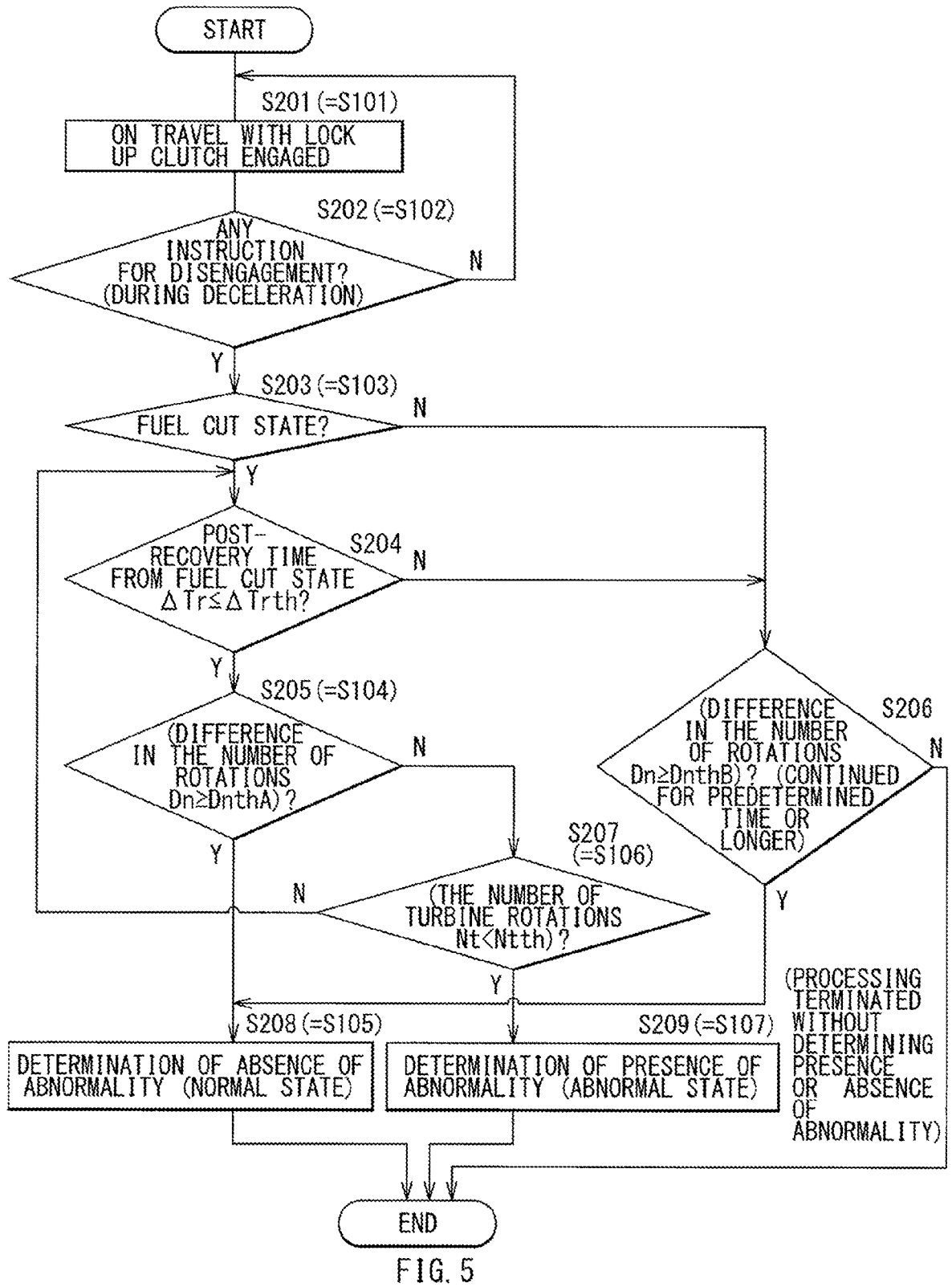
FIG. 5 is a flowchart illustrating an example, i.e., Example 2, of an abnormality determination method according to a second implementation.
Figure 6A:
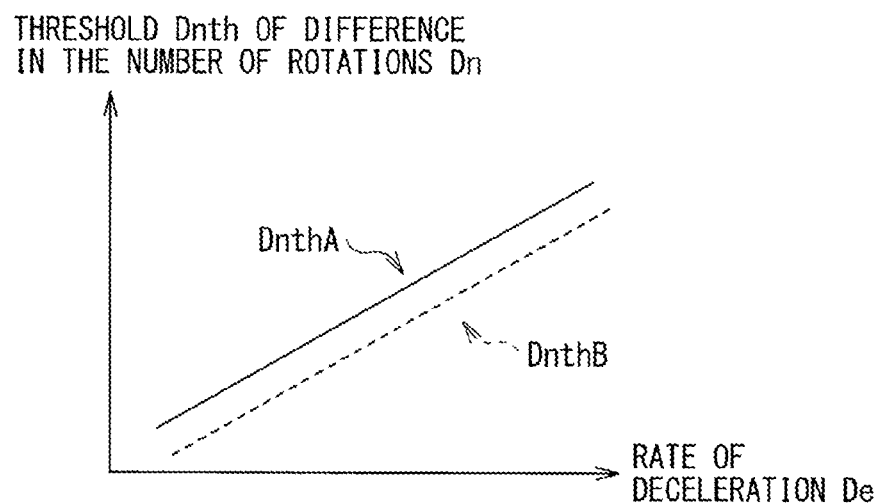
FIG. 6A is a conceptual diagram illustrating schematically an example of corresponding relation between thresholds illustrated in FIG. 5 and the rate of deceleration.
Figure 6B:
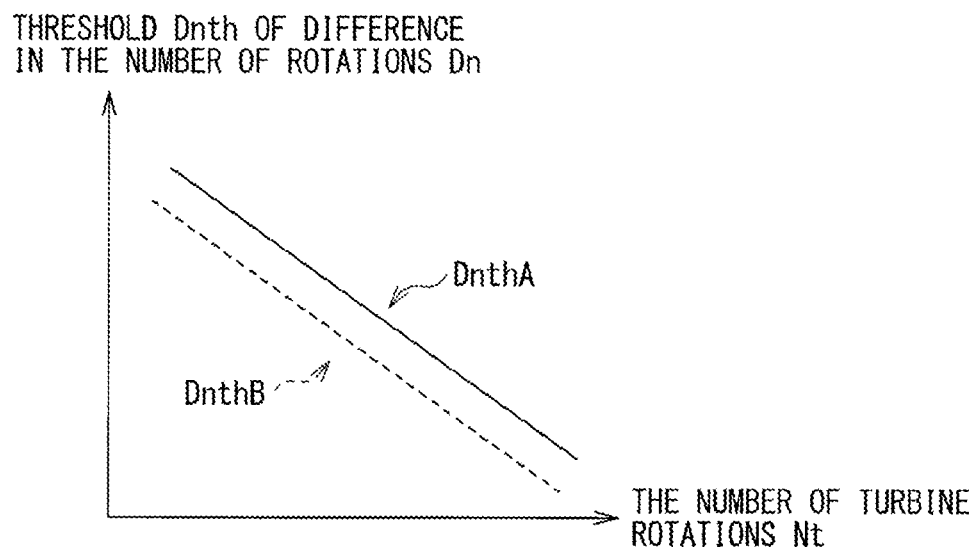
FIG. 6B is a conceptual diagram illustrating schematically an example of corresponding relation between the thresholds illustrated in FIG. 5 and the number of turbine rotations.

FIG. 5 illustrates, in the form of a flowchart, an example, i.e., Example 2, of an abnormality determination method according to a second implementation. FIG. 6A schematically illustrates, in the form of a conceptual diagram, an example of corresponding relation between thresholds illustrated in FIG. 5, i.e., thresholds DnthA and DnthB described later, and the rate of deceleration De. FIG. 6B schematically illustrates, in the form of a conceptual diagram, an example of corresponding relation between the thresholds illustrated in FIG. 5, i.e., the thresholds DnthA and DnthB, and the number of turbine rotations Nt. It is to be noted that the conceptual diagrams of the examples of the corresponding relation illustrated in FIGS. 6A and 6B are provided only for purposes of convenience for easier description, as with the case of FIGS. 3A to 3C as described above. The examples of the corresponding relation, i.e., the examples of the variation mode, are not limited to as illustrated, but may be of other variation modes.

First, unlike the abnormality determination method according to the forgoing first implementation, the abnormality determination method according to this implementation may include determining the presence or the absence of the abnormality even in the case of the forgoing fuel non-cut state, except for some cases described in detail below. It is to be noted that steps S201, S202, S203, S205, S207, S208, and S209 in FIG. 5 are respectively the same as steps S101, S102, S103, S104, S106, S105, and S107 in FIG. 2 described in the first implementation, and description thereof is basically omitted. Refer to notes in parentheses in FIG. 5.

In the abnormality determination method of this implementation, in step S203 (i.e., step S103), in a case where the engine is determined as being in the fuel cut state at the start of the disengagement instruction (step S203:Y), the processing may proceed, before step S205 (i.e., step S104), to step S204 as follows. Before the determination in step S205 as to whether or not the difference in the number of rotations Dn satisfies Dn≥DnthA (DnthA=Dnth), the transmission controller 30a may determine whether or not post-recovery time ΔTr from the fuel cut state is equal to or shorter than a threshold ΔTrth (step S204). In other words, the transmission controller 30a may determine whether or not the post-recovery time ΔTr satisfies ΔTr≤ΔTrth.

One reason for proceeding to step S205 after making such a determination in step S204 is as follows. Let us consider the case where, first, the instruction has been given to the lock up clutch 314 to make the transition to the disengaged state (step S202: Y), and the engine 2 is in the fuel cut state at the start of the disengagement instruction (step S203: Y). In this case, in general, bringing the lock up clutch 314 to the actually disengaged state causes the number of engine rotations Ne to lower. Afterwards, the number of engine rotations Ne becomes smaller than the prescribed number of engine rotations with which a fuel cut is prohibited, causing the engine 2 to recover from the fuel cut state to the fuel non-cut state. As a result, the number of engine rotations Ne increases again. In general, the difference in the number of rotations Dn between the number of engine rotations Ne and the number of turbine rotations Nt tends to be largest immediately after the recovery from the fuel cut state (to the fuel non-cut state). Thus, in this implementation, the transmission controller 30a may determine whether or not the difference in the number of rotations Dn satisfies Dn≥DnthA (step S205), at timing at which the post-recovery time ΔTr from the fuel cut state is equal to or shorter than the threshold ΔTrth (step S204: Y).

It is to be noted that in this implementation, the threshold DnthA (DnthA=Dnth) has a reference character "A" attached for purposes of distinction from the threshold DnthB described later. In one implementation, the threshold DnthA may serve as the "first threshold", as with the threshold Dnth described in the forgoing first implementation. In one implementation, the threshold ΔTrth may serve as a "third threshold".

In the case where the engine 2 is determined as being out of the fuel cut state at the start of the disengagement instruction, i.e., as being in the fuel non-cut state (step S203: N), the transmission controller 30a may determine whether or not the difference in the number of rotations Dn is equal to or larger than the threshold DnthB, i.e., the difference in the number of rotations Dn satisfies Dn≥DnthB (step S206). Moreover, in the case where the post-recovery time ΔTr from the fuel cut state is determined as being longer than the threshold ΔTrth (step S204: N), the transmission controller 30a may also determine whether or not the difference in the number of rotations Dn is equal to or larger than the threshold DnthB, i.e., the difference in the number of rotations Dn satisfies Dn≥DnthB (step S206).

Furthermore, in step S206, the transmission controller 30a may determine whether or not the difference in the number of rotations Dn is equal to or larger than the threshold DnthB, according to whether or not the difference in the number of rotations Dn has continued to be equal to or larger than the threshold DnthB for predetermined time or longer.

In other words, even if the difference in the number of rotations Dn becomes equal to or larger than the threshold DnthB for a short period of time shorter than the predetermined time, e.g., for an instant, the transmission controller 30a may refrain from determining, in step S206, that the difference in the number of rotations Dn satisfies Dn≥DnthB. One reason is as follows. The case where the processing has been routed to step S206 corresponds to a case where the erroneous determination is liable to occur because, as described later, the difference in the number of rotations Dn does not increase easily, and the threshold DnthB is set at a small value. Performing step S206 as described above makes it possible to lower the possibility of the erroneous determination.

The threshold DnthB as mentioned above may be a threshold of a different value (DnthB≠DnthA) from the forgoing threshold DnthA (DnthA=Dnth). In one implementation, the threshold DnthB may serve as a "fourth threshold". Moreover, in particular, in the example illustrated in FIG. 5, the threshold DnthA may be larger than the threshold DnthB (DnthA>DnthB), as illustrated in FIGS. 6A and 6B. It is to be noted that as illustrated in FIGS. 6A and 6B, as with the threshold DnthA, the threshold DnthB may be set to become larger as the rate of deceleration De becomes higher, while becoming smaller as the number of turbine rotations Nt becomes larger.

In the case where the engine 2 is out of the fuel cut state at the start of the disengagement instruction (step S203: N), step S206 may use the threshold DnthB smaller than the threshold DnthA. One reason is as follows. In this case, the difference in the number of rotations Dn does not increase easily, as described in the first implementation. Moreover, step S205 in which the threshold DnthA is used corresponds to timing immediately after the recovery from the fuel cut state, and, therefore, has the tendency that the difference in the number of rotations Dn becomes largest.

Moreover, in the case where the post-recovery time ΔTr from the fuel cut state is determined as being longer than the threshold ΔTrth (step S204: N), the threshold DnthB smaller than the threshold DnthA may be also used in step S206. One reason is as follows. Immediately after the recovery from the fuel cut state, the difference in the number of rotations Dn increases, as described above. Even so, the difference in the number of rotations Dn converges with a lapse of time, and tends to become smaller again.

In step S206 as described, in the case where the difference in the number of rotations Dn is determined as being equal to or larger than the threshold DnthB (step S206: Y), the processing may be as follows. The transmission controller 30a may determine the absence of the abnormality in the lock up clutch 314 (step S208). In other words, the transmission controller 30a may determine that the lock up clutch 314 is in the normal state. Thus, the series of the abnormality determination processing illustrated in FIG. 5 may be terminated.

In the case where the difference in the number of rotations Dn is determined as being smaller than the threshold DnthB (step S206: N), the processing may be as follows. The transmission controller 30a may terminate the series of the abnormality determination processing illustrated in FIG. 5, without determining the presence or the absence of the abnormality in the lock up clutch 314. This leads to more lowered possibility of the erroneous determination, because as mentioned above, step S206 corresponds to the case where the erroneous determination is liable to occur.

(B. Workings and Effects)

As described, in this implementation, in the case where the engine 2 is determined as being in the fuel cut state at the start of the disengagement instruction, the transmission controller 30a may determine whether or not the post-recovery time ΔTr is equal to or shorter than the threshold ΔTrth. The post-recovery time ΔTr is time that has elapsed from the ensuing recovery from the fuel cut state to the fuel non-cut state. Refer to step S204 in FIG. 5. In the case where the engine 2 is determined as being out of the fuel cut state at the start of the disengagement instruction, the transmission controller 30a may determine whether or not the difference in the number of rotations Dn is equal to or larger than the threshold DnthB different from the threshold DnthA. Refer to step S206 in FIG. 5. This makes it possible, as described above, to make the abnormality determination in consideration of the post-recovery time ΔTr during which the difference in the number of rotations Dn increases. Moreover, the threshold DnthB different from the threshold DnthA may be also used in the case of the fuel non-cut state where the first implementation refrains from determining the presence or the absence of the abnormality. This makes it possible to create more opportunities to execute diagnosis. Hence, in this implementation, it is possible to create more opportunities to execute the diagnosis, as compared to the first implementation.

Moreover, in this implementation, in the case where the post-recovery time ΔTr is determined as being equal to or shorter than the threshold ΔTrth, the transmission controller 30a may determine whether or not the difference in the number of rotations Dn is equal to or larger than the threshold DnthA. Refer to step S205 in FIG. 5. In the case where the post-recovery time ΔTr is determined as being longer than the threshold ΔTrth, the transmission controller 30a may determine whether or not the difference in the number of rotations Dn is equal to or larger than the threshold DnthB. Refer to step S206 in FIG. 6. In this way, the two kinds of the thresholds DnthA and DnthB that differ from each other may be used separately in accordance with the determination result as to whether or not the post-recovery time ΔTr is equal to or shorter than the threshold ΔTrth. Hence, it is possible to appropriately make the determination regarding the difference in the number of rotations Dn, in consideration of a length of the post-recovery time ΔTr that influences magnitude of the difference in the number of rotations Dn.

Furthermore, in this implementation, in the case where the difference in the number of rotations Dn is determined as being equal to or larger than the threshold DnthB, the transmission controller 30a may determine the absence of the abnormality. Refer to step S208 in FIG. 5. In the case where the difference in the number of rotations Dn is determined as being smaller than the threshold DnthB, the transmission controller 30a may refrain from determining the presence or the absence of the abnormality. Hence, it is possible to lower the possibility of the erroneous determination as mentioned above, while creating more opportunities to execute the diagnosis.

In addition, in this implementation, the threshold DnthA may be set to be larger than the threshold DnthB. Refer to FIGS. 6A and 6B. Hence, it is possible to make the abnormality determination, in appropriate consideration of each of the forgoing cases in one of which the difference in the number of rotations Dn easily increases and in another of which the difference in the number of rotations Dn easily decreases.

Moreover, in this implementation, the transmission controller 30a may determine whether or not the difference in the number of rotations Dn is equal to or larger than the threshold DnthB according to whether or not the difference in the number of rotations Dn has continued to be equal to or larger than the threshold DnthB for the predetermined time or longer. Refer to step S206 in FIG. 5. Hence, as described, it is possible to lower the possibility of the erroneous determination caused by the case where the difference in the number of rotations Dn does not increase easily.

3. Third Implementation (Abnormality Determination Method of Third Implementation: Example 3)

Figure 7:
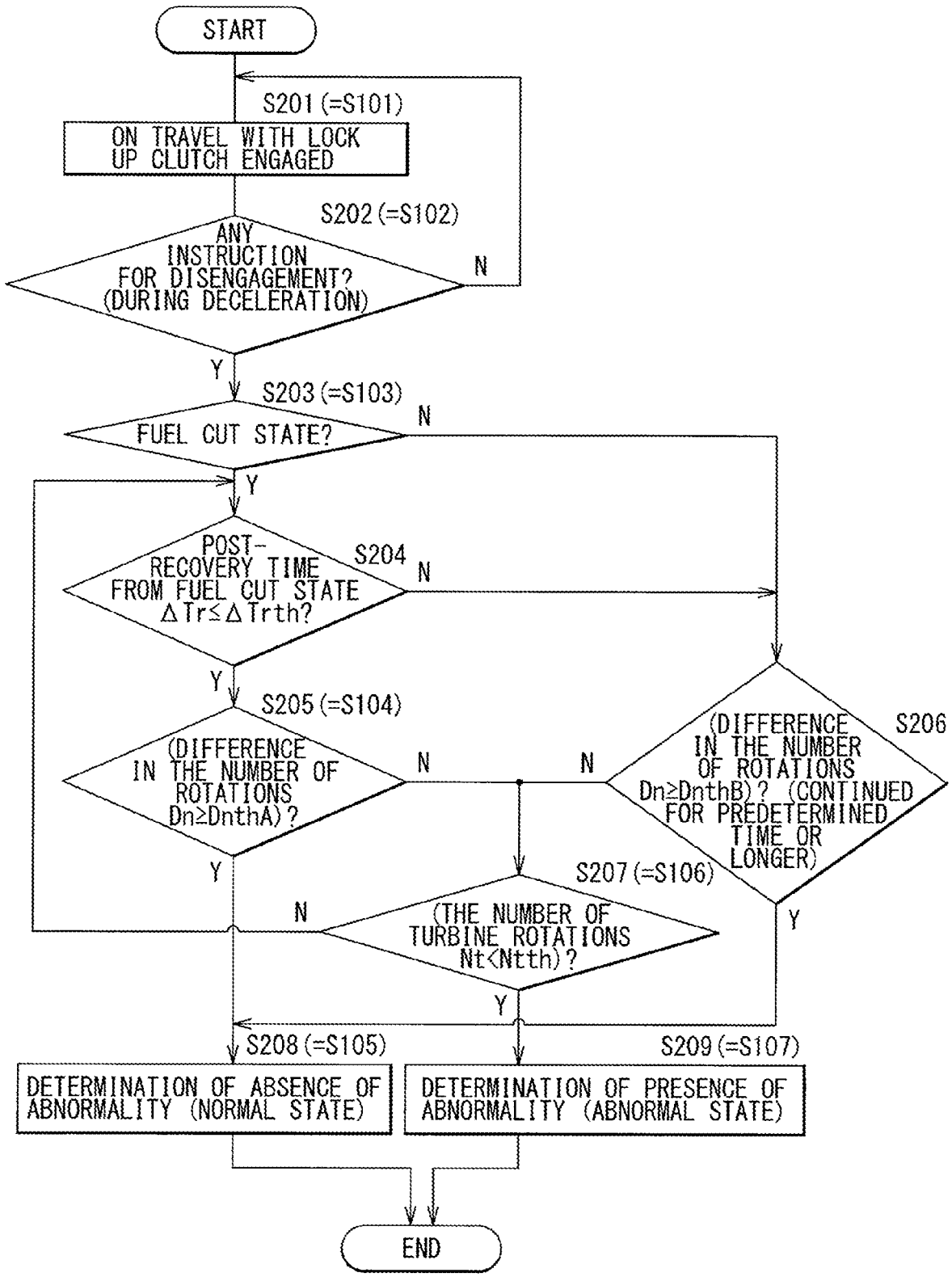
FIG. 7 is a flowchart illustrating an example, i.e., Example 3, of an abnormality determination method according to a third implementation.

FIG. 7 illustrates, in the form of a flowchart, an example, i.e., Example 3, of an abnormality determination method according to a third implementation.

First, unlike the abnormality determination methods of the first and the second implementations as described above, the abnormality determination method of this implementation may include constantly determining the presence or the absence of the abnormality. It is to be noted that steps S201 to S209 in FIG. 7 are respectively the same as steps S201 to S209 illustrated in FIG. 5 described in the second implementation, except for a case described below (i.e., the case of step S206: N). Description of steps S201 to S209 in FIG. 7 is, therefore, basically omitted.

In the abnormality determination method of this implementation, in step S206, in the case where the difference in the number of rotations Dn is determined as being smaller than the threshold DnthB (step S206: N), the processing may be as follows. The processing may proceed, thereafter, to step S207. In step S207, the transmission controller 30a may determine the presence or the absence of the abnormality in accordance with the determination result as to whether or not the number of turbine rotations Nt is smaller than the threshold Ntth. In other words, while the second implementation refrains from determining the presence or the absence of the abnormality in this case, this implementation creates an opportunity to execute the diagnosis in consideration of the determination result regarding the number of turbine rotations Nt. Hence, in this implementation, it is possible to create more opportunities to execute the diagnosis, as compared to the second implementation.

4. Modification Example

Description is given next of a modification example common to the first to the third implementations described so far. It is to be noted that the same constituent elements as those in the first to the third implementations are denoted by the same reference characters, and description thereof is omitted as appropriate.

(A. Abnormality Determination Method of Modification Example: Example 4)

Figure 8:
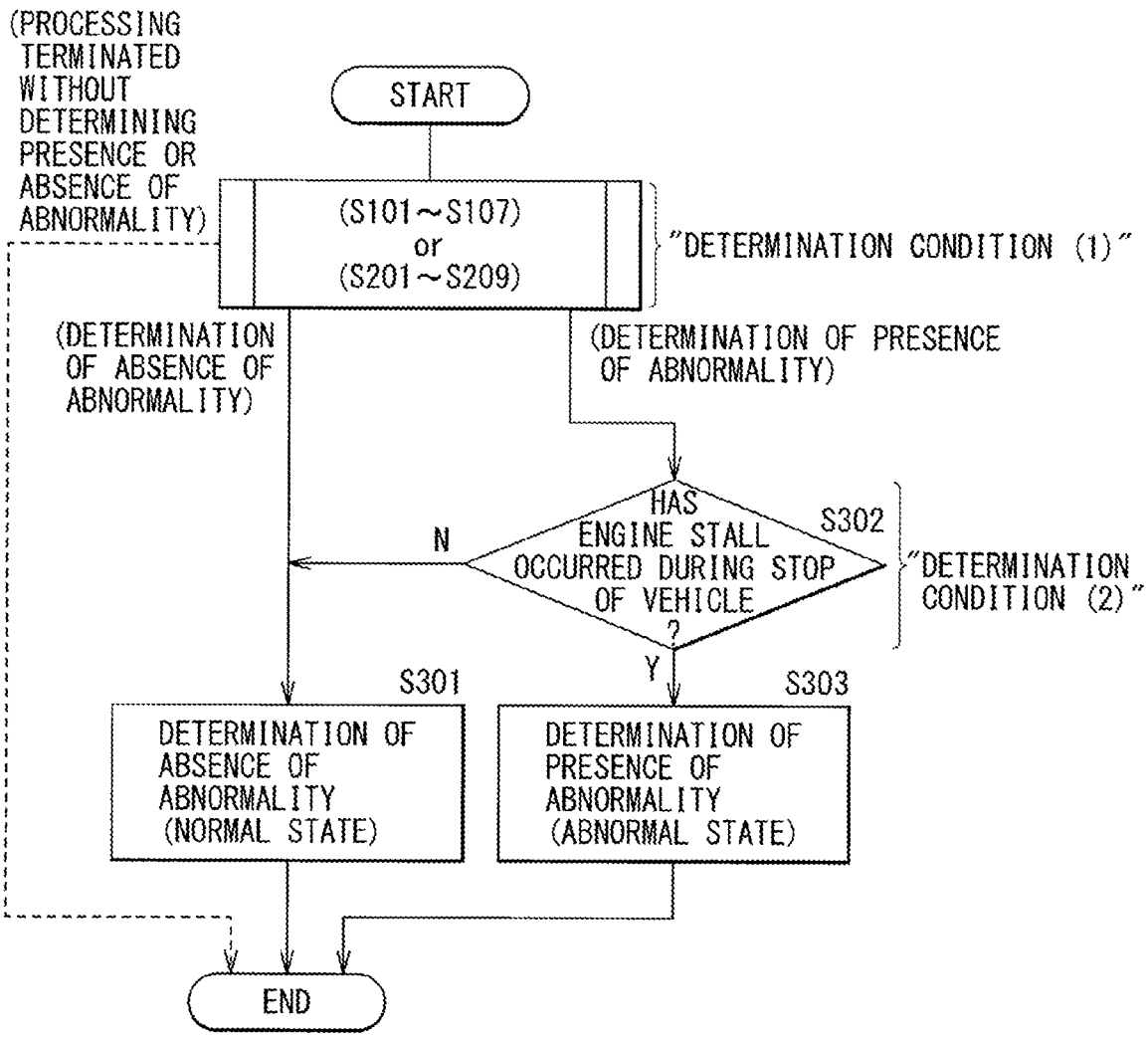
FIG. 8 is a flowchart illustrating an example, i.e., Example 4, of an abnormality determination method according to a modification example.

FIG. 8 illustrates, in the form of a flowchart, an example, i.e., Example 4, of an abnormality determination method according to this modification example.

The first to the third implementations as described may include making a determination corresponding to the determination condition (A) in the abnormality determination method of the forgoing comparative example, to make the abnormality determination regarding the lock up clutch 314. Specifically, the determination of the presence of the abnormality may be made, in the case where the difference in the number of rotations Dn between the number of engine rotations Ne and the number of turbine rotations Nt does not become larger than the threshold Dnth (Dnth=DnthA), with the disengagement instruction given to the lock up clutch 314. It is to be noted that in this modification example, this determination condition in the first to the third implementations is referred to, in the following, as a "determination condition (1)".

This modification example may further include making a determination corresponding to the determination condition (B) in the abnormality determination method of the forgoing comparative example, in addition to that corresponding to the determination condition (1), to make the abnormality determination regarding the lock up clutch 314. In other words, in this modification example, the transmission controller 30a may make a final determination as to the presence or the absence of the abnormality, in consideration of a determination result as to whether or not the engine stall state in the engine 2 has occurred in the stopped state of the vehicle 1, in addition to the determination result as to whether or not the difference in the number of rotations Dn is equal to or larger than the threshold Dnth (Dnth=DnthA). It is to be noted that in this modification example, this determination condition is referred to, in the following, as a "determination condition (2)".

FIG. 8 illustrates a specific example of the abnormality determination method according to this modification example. Referring to FIG. 8, the transmission controller 30a may, first, determine whether or not the forgoing determination condition (1) is established. Refer to steps S101 to S107 in FIG. 2 and steps S201 to S209 in FIGS. 5 and 7. As mentioned above, in the case where the determination as to the presence or the absence of the abnormality is not to be made, the series of the abnormality determination processing illustrated in FIG. 8 may be also terminated in this modification example as well. In the case where the determination of the absence of the abnormality has been made, the transmission controller 30a may also make the final determination of the absence of the abnormality in this modification example as well (step S301 in FIG. 8). In other words, the transmission controller 30a may finally determine that the lock up clutch 314 is in the normal state. Thus, the series of the abnormality determination processing illustrated in FIG. 8 may be terminated.

In the case where the determination of the presence of the abnormality has been made, in this modification example, the transmission controller 30a may, thereafter, make a determination as to whether or not the forgoing determination condition (2) is established (step S302). Specifically, the transmission controller 30a may determine whether or not the engine stall state has occurred in the stopped state of the vehicle 1. In a case where a determination has been made that no engine stall state has occurred (step S302: N), in this modification example, the transmission controller 30a may make the final determination of the absence of the abnormality (step S301). Thus, the series of the abnormality determination processing illustrated in FIG. 8 may be terminated. In a case where a determination has been made that the engine stall state has occurred (step S302: Y), in this modification example, the transmission controller 30a may make the final determination of the presence of the abnormality (step S303). In other words, the transmission controller 30a may finally determine that the lock up clutch 314 is in the abnormal state. Thus, the series of the abnormality determination processing illustrated in FIG. 8 may be terminated.

(B. Workings and Effects)

As described, in this modification example, the transmission controller 30a may make the final determination as to the presence or the absence of the abnormality in consideration of the determination result as to whether or not the engine stall state has occurred in the stopped state of the vehicle 1, together with the determination result as to whether or not the difference in the number of rotations Dn is equal to or larger than the threshold Dnth (Dnth=DnthA). In this way, this modification example may include making the abnormality determination in consideration of the occurrence or non-occurrence of the engine stall state. Hence, it is possible to enhance the precision of the abnormality determination even more, as compared to the first to the third implementations as described above.

5. Other Modification Examples

Although description has been made by giving the implementations and the modification example, the contents of the disclosure are not limited to the above-mentioned example implementations and may be modified in a variety of ways.

For example, configurations of members in the vehicle 1, e.g., types, shapes, arrangements, and the number of the members, are not limited to as described in the forgoing example implementations. The members, e.g., the engine 2, the automatic transmission 3, the control valve 30b, the operators 4, and the sensors 5, may be of other configurations. For example, the members may be of other types, shapes, and/or arrangements, or the number of the members may be altered. Moreover, values, ranges, relation in magnitude, and other factors of various parameters described in the forgoing example implementations are not limited to as described in the forgoing example implementations. The parameters may be of other values, ranges, relation in magnitude, and other factors. For example, the setting of the threshold DnthA and DnthB may be provided in an opposite way to as described in the forgoing example implementations, as the case may be. For example, the threshold DnthA may be set to be larger than the threshold DnthB (DnthA<DnthB), as the case may be.

Moreover, in the forgoing example implementations, description has been made by giving some specific examples regarding the abnormality determination method of the lock up clutch 314, but the examples are non-limiting. For example, as described in the forgoing example implementations, the abnormality determination may be made in consideration of both the rate of deceleration De and the fuel cut state at the start of the disengagement instruction. In an alternative example, the abnormality determination may be made solely in consideration of either one of them, i.e., in consideration of either the rate of deceleration De or the fuel cut state at the start of the disengagement instruction.

Furthermore, in the forgoing example implementations, description is given of examples in which the thresholds Dnth, DnthA, and DnthB each vary with both the rate of deceleration De and the number of turbine rotations Nt, but the examples are non-limiting. Specifically, the thresholds Dnth, DnthA, and DnthB may each take a value that does not depend on, for example, the number of turbine rotations Nt, i.e., a value that depends solely on the rate of deceleration De.

In addition, the series of the processing described in the forgoing example implementations may be performed by either hardware, e.g., circuitry, or software, e.g., programs. In a case with the software, the software may include a group of programs that cause a computer to execute respective functions. For example, the programs may be incorporated in advance in the computer and be used, or alternatively, the programs may be installed from a network or a recording medium into the computer and be used.

Moreover, the various examples described in the forgoing may be applied in any combination.

It is to be noted that the effects described herein are merely illustrative and non-limiting. Effects to be achieved by the disclosure may be other effects than those described above, or may further include other effects in addition to those described above.

The transmission controller 30a illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the transmission controller 30a illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the transmission controller 30a illustrated in FIG. 1.

Although the technology has been described in terms of exemplary implementations, it is not limited thereto. It should be appreciated that variations may be made in the described implementations by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An abnormality determination device of a lock up clutch, the abnormality determination device comprising:
   a controller configured to set the lock up clutch in a torque converter at an engaged state or a disengaged state, the torque converter being provided in an automatic transmission of a vehicle, the engaged state including permitting linkage between a rotating member on input side and a rotating member on output side in the torque converter, and the disengaged state including interrupting the linkage between the rotating member on the input side and the rotating member on the output side; and
   a determining unit configured to determine presence or absence of an abnormality in the lock up clutch, the abnormality corresponding to a situation that the lock up clutch is stuck in the engaged state,
   the determining unit being configured to determine,
   on a condition that deceleration of the vehicle on travel with the lock up clutch in the engaged state causes a control signal to be outputted from the controller, the control signal causing the lock up clutch to make a transition to the disengaged state,
   the presence or the absence of the abnormality in the lock up clutch, on a basis of a determination result as to whether or not a difference in number of rotations is equal to or larger than a first threshold, the first threshold varying with a rate of deceleration of the vehicle, the difference in the number of rotations being a difference between number of engine rotations and number of turbine rotations, the number of engine rotations being number of rotations of an engine that transmits rotation to the rotating member on the input side, and the number of turbine rotations being number of rotations of the rotating member on the output side.

2. The abnormality determination device of the lock up clutch according to claim 1, wherein the first threshold is set to become larger as the rate of deceleration becomes higher.

3. The abnormality determination device of the lock up clutch according to claim 1, wherein the first threshold is further set to vary with the number of turbine rotations.

4. The abnormality determination device of the lock up clutch according to claim 1, wherein the determining unit
   determines the absence of the abnormality on a condition that the difference in the number of rotations is determined as being equal to or larger than the first threshold, and
   determines, on a condition that the difference in the number of rotations is determined as being smaller than the first threshold, the presence or the absence of the abnormality in accordance with a determination result as to whether or not the number of turbine rotations is smaller than a second threshold, the second threshold varying with the rate of deceleration.

5. The abnormality determination device of the lock up clutch according to claim 4, wherein the determining unit determines the presence of the abnormality solely on a condition that the number of turbine rotations is determined as being smaller than the second threshold.

6. The abnormality determination device of the lock up clutch according to claim 4, wherein the second threshold is set to become larger as the rate of deceleration becomes higher.

7. The abnormality determination device of the lock up clutch according to claim 1, wherein the determining unit determines the presence or the absence of the abnormality, in further consideration of a determination result as to whether or not the engine is in a fuel cut state at a start of a disengagement instruction, the fuel cut state being a state devoid of fuel supply to the engine, and the disengagement instruction allowing the control signal to be outputted, the control signal causing the lock up clutch to make the transition to the disengaged state.

8. The abnormality determination device of the lock up clutch according to claim 7, wherein the determining unit
   determines the presence or the absence of the abnormality on a condition that the engine is determined as being in the fuel cut state at the start of the disengagement instruction, and
   refrains from determining the presence or the absence of the abnormality on a condition that the engine is determined as being out of the fuel cut state at the start of the disengagement instruction.

9. The abnormality determination device of the lock up clutch according to claim 7, wherein the determining unit
   determines, on a condition that the engine is determined as being in the fuel cut state at the start of the disengagement instruction, whether or not post-recovery time is equal to or shorter than a third threshold, the post-recovery time being time that has elapsed from an ensuing recovery from the fuel cut state to a fuel non-cut state, and
   determines, on a condition that the engine is determined as being out of the fuel cut state at the start of the disengagement instruction, whether or not the difference in the number of rotations is equal to or larger than a fourth threshold, the fourth threshold being different from the first threshold.

10. The abnormality determination device of the lock up clutch according to claim 9, wherein the determining unit
    determines whether or not the difference in the number of rotations is equal to or larger than the first threshold, on a condition that the post-recovery time is determined as being equal to or shorter than the third threshold, and
    determines whether or not the difference in the number of rotations is equal to or larger than the fourth threshold, on a condition that the post-recovery time is determined as being longer than the third threshold.

11. The abnormality determination device of the lock up clutch according to claim 9, wherein the determining unit
    determines the absence of the abnormality on a condition that that the difference in the number of rotations is determined as being equal to or larger than the fourth threshold, and
    refrains from determining the presence or the absence of the abnormality on a condition that the difference in the number of rotations is determined as being smaller than the fourth threshold.

12. The abnormality determination device of the lock up clutch according to claim 9, wherein the determining unit
    determines the absence of the abnormality on a condition that the difference in the number of rotations is determined as being equal to or larger than the fourth threshold, and
    determines, on a condition that the difference in the number of rotations is determined as being smaller than the fourth threshold, the presence or the absence of the abnormality in accordance with the determination result as to whether or not the number of turbine rotations is smaller than the second threshold, the second threshold varying with the rate of deceleration.

13. The abnormality determination device of the lock up clutch according to claim 9, wherein the first threshold is larger than the fourth threshold.

14. The abnormality determination device of the lock up clutch according to claim 9, wherein the determining unit determines whether or not the difference in the number of rotations is equal to or larger than the fourth threshold, according to whether or not the difference in the number of rotations has continued to be equal to or larger than the fourth threshold for predetermined time or longer.

15. The abnormality determination device of the lock up clutch according to claim 1, wherein the determining unit determines the presence or the absence of the abnormality in further consideration of a determination result as to whether or not an engine stall state in the engine has occurred in a stopped state of the vehicle, in addition to the determination result as to whether or not the difference in the number of rotations is equal to or larger than the first threshold.

16. An abnormality determination method of a lock up clutch, the abnormality determination method comprising:

controlling including setting a lock up clutch in a torque converter at an engaged state or a disengaged state, the torque converter being provided in an automatic transmission of a vehicle, the engaged state including permitting linkage between a rotating member on input side and a rotating member on output side in the torque converter, and the disengaged state including interrupting the linkage between the rotating member on the input side and the rotating member on the output side; and determining including determining presence or absence of an abnormality in the lock up clutch, the abnormality corresponding to a situation that the lock up clutch is stuck in the engaged state, the determining including determining, on a condition that deceleration of the vehicle on travel with the lock up clutch in the engaged state causes a control signal to be outputted in the controlling, the control signal causing the lock up clutch to make a transition to the disengaged state, the presence or the absence of the abnormality in the lock up clutch, on a basis of a determination result as to whether or not a difference in number of rotations is equal to or larger than a first threshold, the first threshold varying with a rate of deceleration of the vehicle, the difference in the number of rotations being a difference between number of engine rotations and number of turbine rotations, the number of engine rotations being number of rotations of an engine that transmits rotation to the rotating member on the input side, and the number of turbine rotations being number of rotations of the rotating member on the output side.

* * * * *